United States Patent
Dooley et al.

(10) Patent No.: US 7,476,993 B2
(45) Date of Patent: Jan. 13, 2009

(54) METHOD OF MAKING ELECTRIC MACHINE WINDING

(75) Inventors: Kevin Allan Dooley, Mississauga (CA); Jerzy Wasiewicz, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 355 days.

(21) Appl. No.: 11/412,897

(22) Filed: Apr. 28, 2006

(65) Prior Publication Data

US 2007/0252450 A1  Nov. 1, 2007

(51) Int. Cl.
 *H02K 9/00* (2006.01)
(52) U.S. Cl. ....................................... 310/54
(58) Field of Classification Search .............. 310/54, 310/52, 59, 60, 65; 29/606, 596; 174/15.1, 174/15.2; 361/699, 700; 165/80.4; 257/714
See application file for complete search history.

(56) References Cited

U.S. PATENT DOCUMENTS

| | | | |
|---|---|---|---|
| 1,821,250 A | 9/1931 | Wadsten | |
| 3,119,033 A | 1/1964 | Horsely et al. | |
| 3,447,002 A | 5/1969 | Ronnevig | |
| 3,597,645 A | 8/1971 | Duffert et al. | |
| 3,835,923 A | 9/1974 | Platell | |
| 4,028,653 A * | 6/1977 | Carlsson et al. | 336/60 |
| 4,384,168 A | 5/1983 | Kenney | |
| 4,516,044 A | 5/1985 | Bone | |
| 4,798,241 A | 1/1989 | Jarrett et al. | |
| 4,899,812 A | 2/1990 | Altoz | |
| 4,908,537 A * | 3/1990 | Sismour, Jr. | 310/51 |
| RE33,528 E | 1/1991 | Doty | |
| 5,291,943 A | 3/1994 | Dhir | |
| 5,491,371 A | 2/1996 | Ooi | |
| 5,578,879 A * | 11/1996 | Heidelberg et al. | 310/54 |
| 5,623,175 A | 4/1997 | Ronning et al. | |
| 5,638,900 A | 6/1997 | Lowenstein et al. | |
| RE35,890 E | 9/1998 | So | |
| 6,362,545 B1 | 3/2002 | Prole et al. | |
| 6,453,989 B1 | 9/2002 | Watanabe et al. | |
| 6,498,408 B2 | 12/2002 | Tong et al. | |
| 6,504,274 B2 | 1/2003 | Bunker et al. | |
| 6,615,911 B1 | 9/2003 | Bhatti et al. | |
| 6,628,020 B1 | 9/2003 | Tong | |
| 6,634,421 B2 | 10/2003 | Ognibene et al. | |
| 6,740,993 B2 * | 5/2004 | Greubel et al. | 310/59 |
| 6,798,097 B2 * | 9/2004 | Pullen et al. | 310/65 |
| 6,865,081 B2 * | 3/2005 | Meyer et al. | 361/699 |
| 2001/0035285 A1 | 11/2001 | Ognibene et al. | |
| 2005/0072595 A1 | 4/2005 | Cho | |
| 2008/0100159 A1 * | 5/2008 | Dawsey et al. | 310/54 |

FOREIGN PATENT DOCUMENTS

CA  2400982  9/2001

OTHER PUBLICATIONS

Incropera, Frank P. and DeWitt, David P. Fundamentals of Heat and mass Transfer, Fourth Edition. John Wiley & Sons. 1996. pp. 420-421.

* cited by examiner

*Primary Examiner*—Chandrika Prasad
(74) *Attorney, Agent, or Firm*—Ogilvy Renault LLP

(57) ABSTRACT

A method of providing an electric machine winding having a fluid flow channel, for receiving coolant fluid therein is disclosed. The method includes impressing the channel into a peripheral surface using a die having a shape corresponding to a desired fluid flow cooling path of the channel.

20 Claims, 5 Drawing Sheets

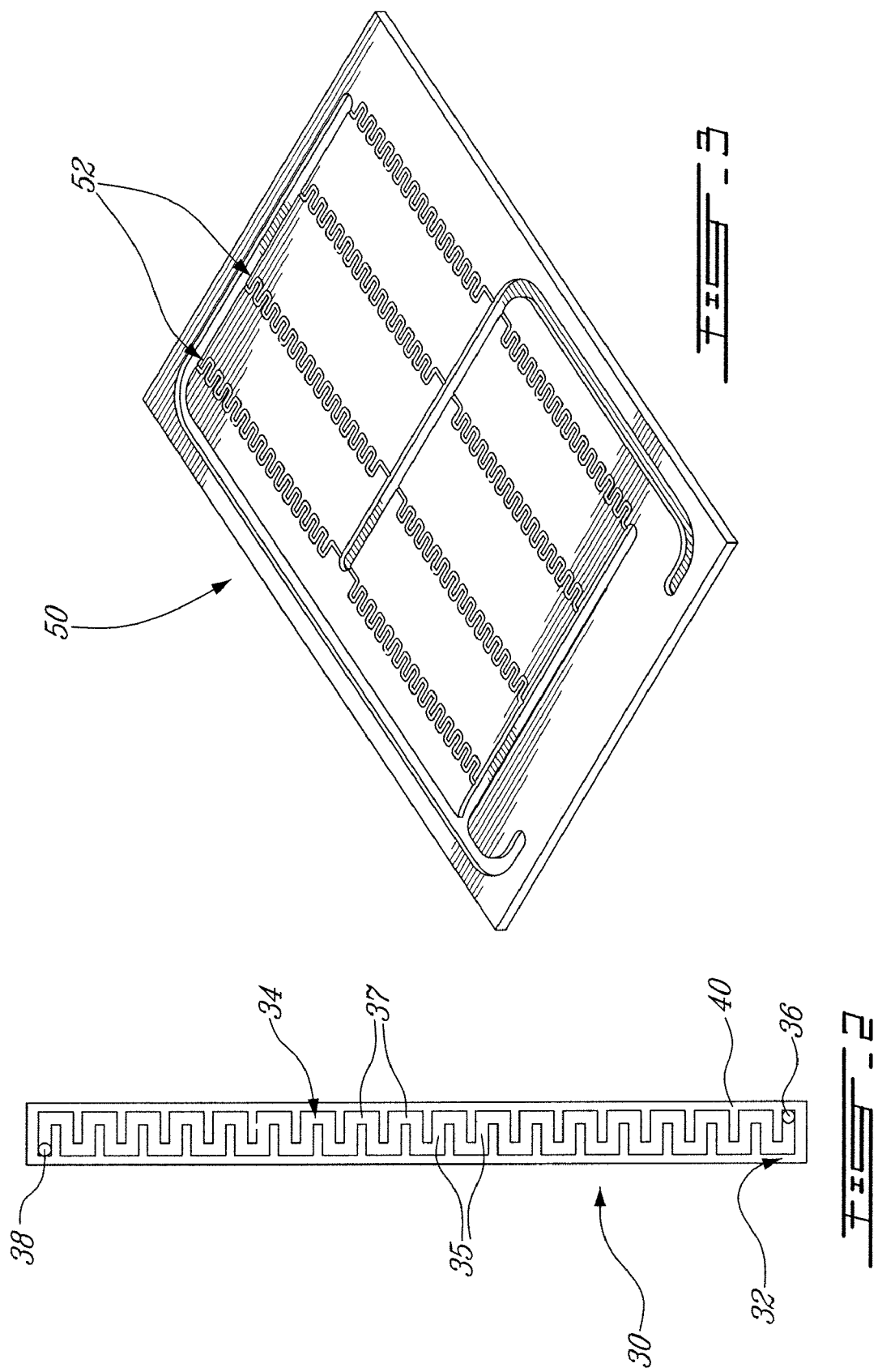

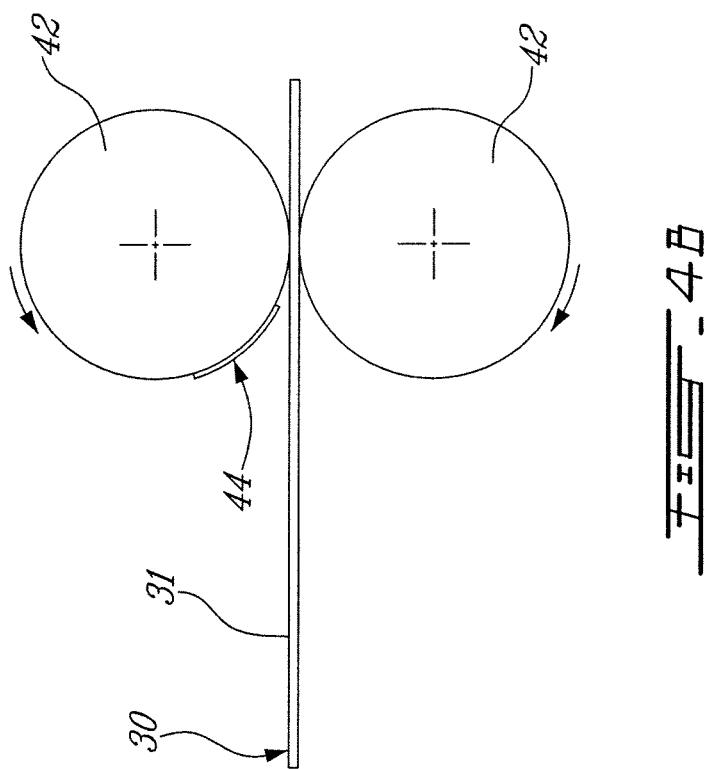
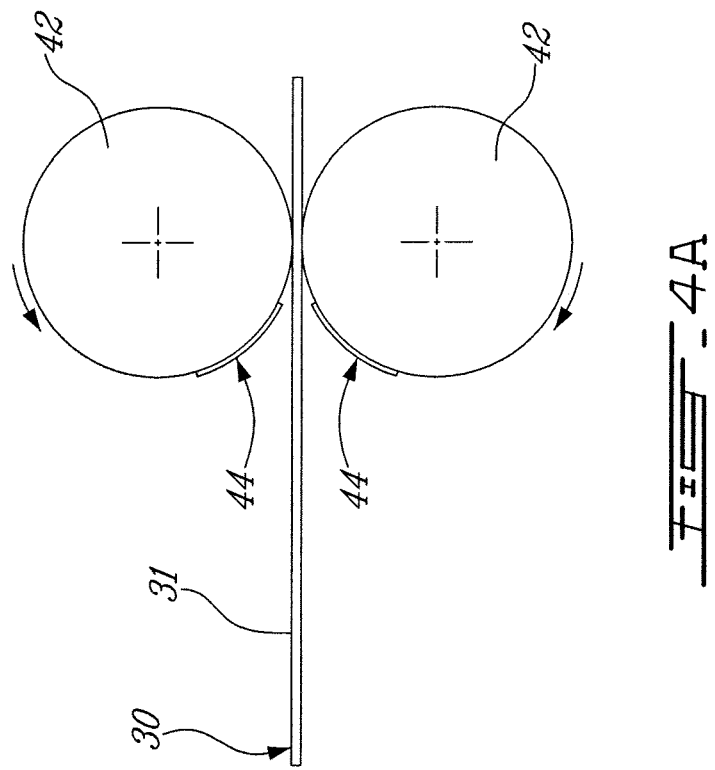

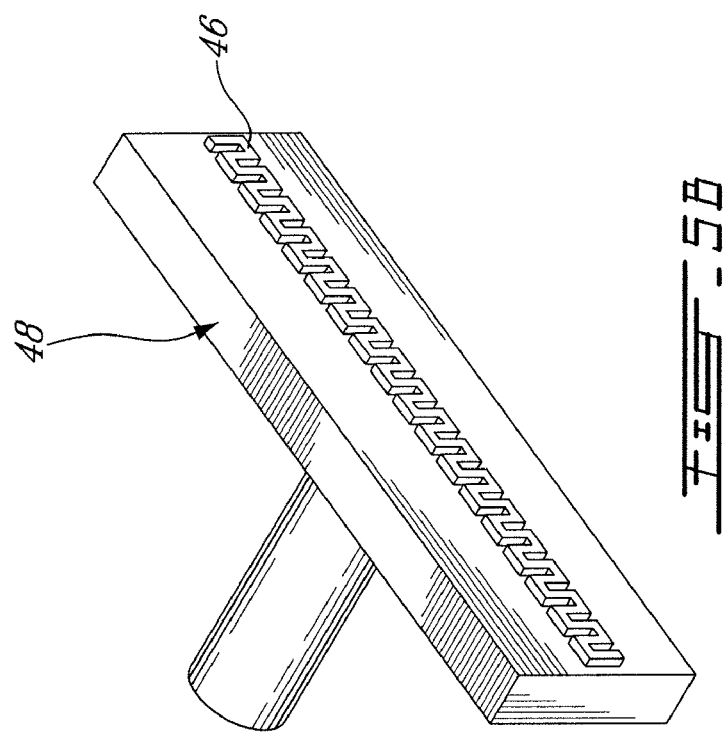
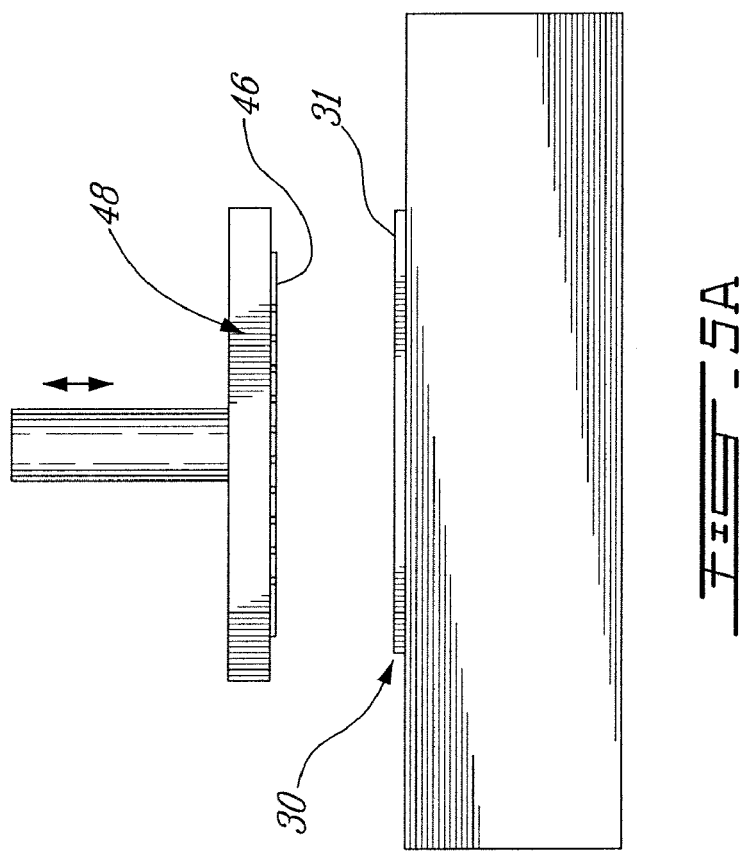

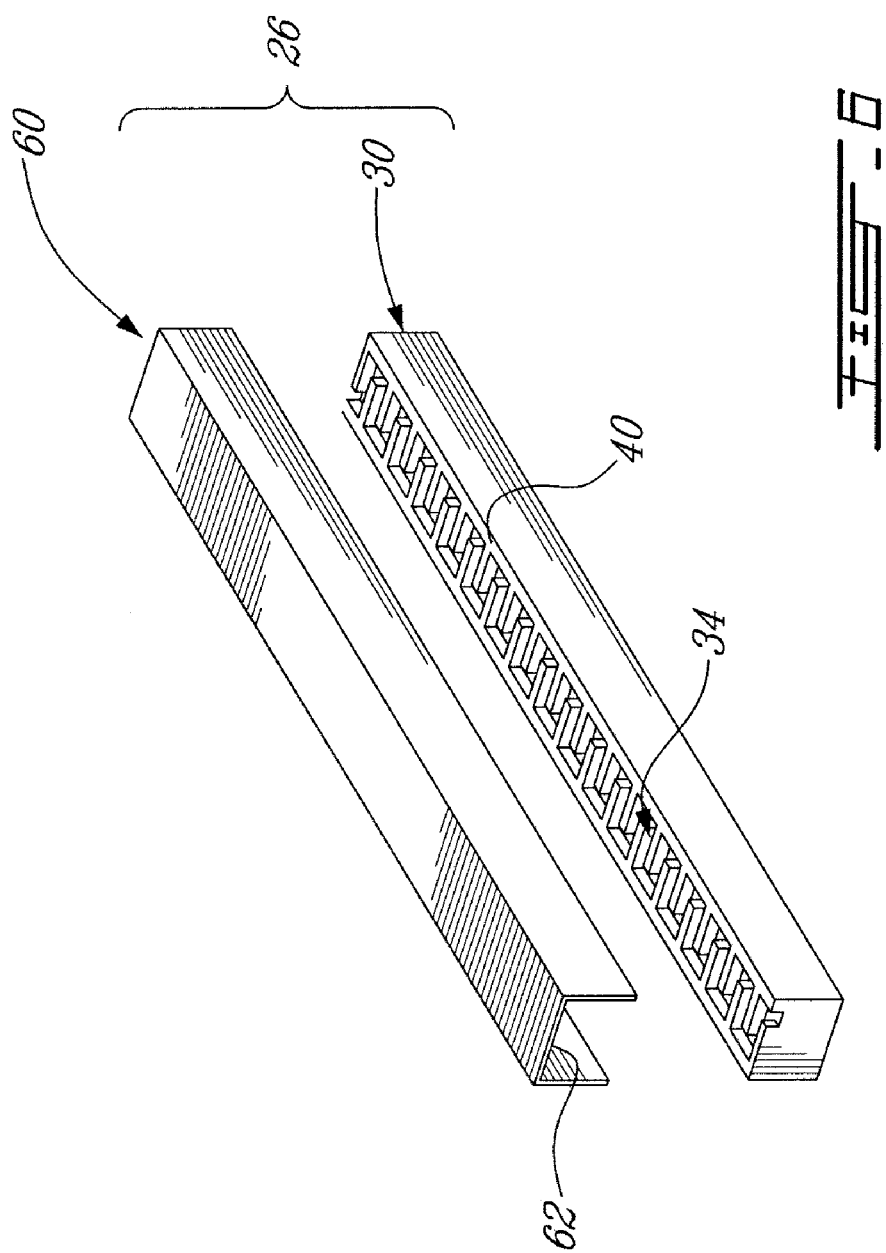

METHOD OF MAKING ELECTRIC MACHINE WINDING

TECHNICAL FIELD

The present invention relates generally to an electric machine, and more particularly to an improved electric machine winding and method of making same.

BACKGROUND OF THE ART

Rotating electric machines such as electric motors and generators typically include a stator and a rotor which rotates relative to the stator. Depending on the type of electrical machine (i.e. motor, generator, AC, DC, etc.), either the rotor or the stator includes electrically conductive windings. As these windings tend to become hot as a result of the current flowing therethrough, it is known to provide these windings with cooling means in the form of a fluid coolant fed through fluid-flow passages defined a body of the winding. Thus such cooling means act as a heat exchanger to exchange heat between the surrounding winding body and the coolant fluid flowing therethrough.

However small electric machines require very small-scale cooling channels to be formed, such as by machining, within the body of the windings. Such small cooling channels are difficult and expensive to manufacture. Accordingly, improvement is sought.

SUMMARY OF THE INVENTION

It is therefore an object of the present invention to provide an improved method of making an electric machine winding.

In accordance with one aspect of the present invention there is provided a method of making a winding of an electric machine having a channel being adapted to receive coolant fluid therein for cooling the winding, the method comprising: providing at least one winding portion with peripheral surface in which to form the fluid flow channel; providing a die having a shape corresponding to a desired fluid flow cooling path; and impressing the channel into the peripheral surface of the winding portion using the die, the channel having the fluid flow cooling path of the die.

In accordance with another aspect of the present invention, there is further provided a method of forming a fluid flow passage within a winding of an electric machine, the passage being adapted to receive coolant fluid therein for cooling the winding, the method comprising: providing a winding body with a peripheral surface; impressing an open-topped channel into the peripheral surface of the winding body using a die having a shape corresponding to a desired fluid flow cooling path, the channel thereby defining said fluid flow cooling path; and enclosing the channel to define the fluid flow passage within the winding body by sealingly engaging a sealing surface of a closure against the peripheral surface of the winding body.

There is also provided, in accordance with another aspect of the present invention, a method of manufacturing an electric machine winding comprising: impressing an open-topped fluid flow channel into at least one peripheral surface of a body portion of the winding; and enclosing the channel to define a fluid flow passage within the winding by sealingly engaging a planar sealing surface of a closure against the peripheral surface of the body portion, the planar sealing surface defining at least a part of a wall enclosing the fluid flow passage.

There is further provided, in accordance with yet another aspect of the present invention, an electric machine comprising a rotor, a stator and at least one winding, the winding having a body including a channel having an open top and formed in a peripheral surface thereof, the channel defining a predetermined coolant flow path and extending between an inlet in communication with a source of coolant fluid and an outlet in communication with a collector of the coolant fluid, a closure fastened to the body to enclose the open top of the channel such as to form a sealed fluid flow passage having the coolant flow path within the winding, the closure including a mating sealing surface abutted against the peripheral surface of the winding body, the planar sealing surface defining at least a part of a wall enclosing the fluid flow passage.

Further details of these and other aspects of the present invention will be apparent from the detailed description and Figures included below.

DESCRIPTION OF THE DRAWINGS

Reference is now made to the accompanying Figures depicting aspects of the present invention, in which:

FIG. 2 is a section view of a conductive winding from the electric machine of FIG. 1, the winding having a fluid flow passage formed therein in accordance with the method of one aspect of the present invention; and FIG. 3 is a perspective view of a portion of a heat sink plate having fluid flow passages formed in accordance with one aspect of the present invention;

FIG. 4a is a schematic side view of a method of impressing a fluid flow passage within a winding in accordance with one embodiment of the present invention;

FIG. 4b is a schematic side view of a method of impressing a fluid flow passage within a winding in accordance with another embodiment of the present invention;

FIG. 5a is a schematic side view of a method of impressing a fluid flow passage within a winding in accordance with a different embodiment of the present invention;

FIG. 5b is a schematic perspective view of a stamping plate having a die therein used to impress the fluid flow passage within the winding in accordance with the method of FIG. 5a; and FIG. 6 is a perspective view of a conductive winding from the electric machine of FIG. 1, the winding having a fluid flow passage defined therein in accordance with another method of the present invention.

DETAILED DESCRIPTION OF PREFERRED EMBODIMENTS

Figure 1:
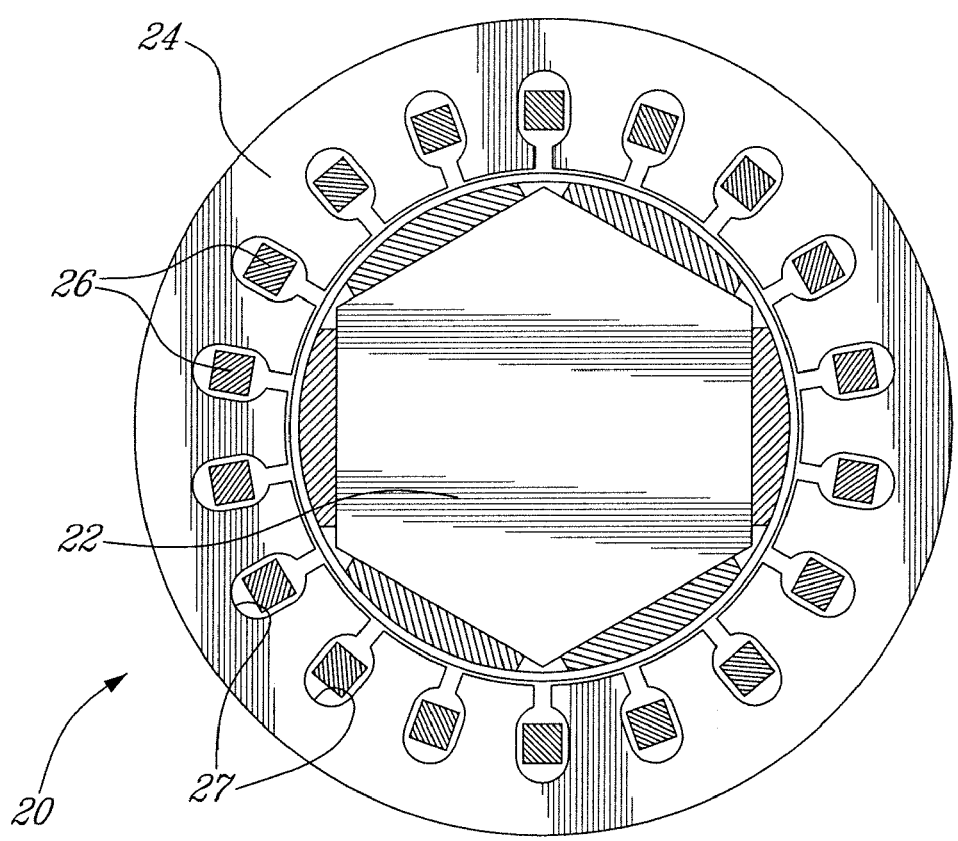
FIG. 1 is a transverse cross-sectional view of an electric machine incorporating the present invention.

A small electric machine, such as an electric motor for a gas turbine engine for example, includes very small-scale cooling passages formed within the windings of the electric machine such as to provide cooling to the windings. Such cooling passages or channels may be formed having a tortuous path in order to maximize the convective heat transfer when a coolant fluid is fed therethrough. U.S. patent application Ser. No. 10/864,360 filed Jun. 10, 2004, the entire specification of which is incorporated herein by reference, discloses such a tortuous cooling flow path within the winding of an electric machine. Such a tortuous cooling flow passage within the machine's winding effectively exchanges heat between the coolant fluid and the hot winding, however machining operations such as milling, routing, electric discharge machining or chemical etching used to form such cooling flow paths are relatively expensive and time consuming. The present invention thus permits such a complex fluid flow path to be more quickly and inexpensively formed in the windings of such an electrical machine.

The present invention has application in a wide variety of environments, however the skilled reader will appreciate that, although the invention may be adequately described with reference to a single environment (such as the electric machine described below), application of the invention is by no means limited to the specific example described. The following example is therefore but one of many applications to which the invention may be applied.

Referring to FIG. 1, an electric machine 20 such as a motor/generator generally includes a rotor 22 and a stator 24, the stator having at least one winding 26 in accordance with one aspect of the present invention, as described in further detail below. In the embodiment depicted the magnetic rotor 22 rotates within the surrounding and stationary stator 24 having at least one current-carrying winding 26 disposed therein. As depicted, a plurality of such windings 26 are circumferentially disposed about the stator 24. The electric machine 20 may be operated as a motor or a generator, or both, though it will be understood that heat dissipation in windings 26 will typically be a greater concern in a generator application. Typically, three-phase windings will be provided in such a machine, such that there will be at least three separate windings 26. Winding (s) 26 are preferably bar-type conductors, as best seen in FIG. 3 described below. The windings 26 in successive slots 27 are typically appropriately connected by end turns (not shown) or a squirrel cage (not shown), depending on the machine type. The electric machine 20 as shown is an alternating current (AC) machine, however a direct current (DC) configuration is similarly possible. The present invention may be applied with any suitable electric machine architecture. Some electric machines can have very high current densities and thus, extensive cooling of the windings may become necessary.

Referring to FIG. 2, a portion 30 of a winding 26 of the type described in commonly-assigned co-pending U.S. patent application Ser. No. 10/864,360 is depicted in axial cross-section, such that the inside of the winding portion is visible. Portion 30, in this embodiment, represents the portion of the winding disposed in a slot 27 of the stator 24 (i.e. the portion of the winding between successive end turns). Typically, it is this "leg" portion of the winding which has the most difficult heat rejection requirements. The winding portion 30 comprises a winding conductor body 32, which can be any suitable conductor material (e.g. copper, aluminum, etc.) within which a cooling flow passage 34 is formed. The cooling flow passage 34 extends in fluid flow communication between a coolant fluid inlet 36 at one end of the winding and a coolant fluid outlet 38 at an opposed end of the winding portion. A source of coolant, such as an oil system (not shown or a coolant fluid system, is in fluid communication with the inlet 36 to provide 'fresh' coolant thereto, and with outlet 38 to retrieve 'spent' coolant therefrom for return to the oil or other system. In this embodiment, the coolant flow passage 34 defines a tortuous flow path, defined impressed within a substantially flat surface 40 of the winding body 32. In the embodiment depicted, the tortuous coolant flow passage 34 defines a serpentine and sinuous configuration which includes a plurality of alternating first channel segments 35 and second channel segments 37 in fluid flow communication and arranged substantially perpendicular to one another. However, other fluid flow paths are alternately possible.

The fluid flow passage 34 is formed within the portion 30 of the winding 26 by impressing the channel within the outer surface 40 of the winding portion. The terms "impress" and "impressing" as used herein are intended to include any operation which involves pressing a die, having a pattern and configuration of the desired coolant flow path, into the surface 40 of the portion 30 of the winding 26 in order to deform the material of the winding portion and thus form the coolant passage 34 therewithin. The die may be disposed on a roller, as shown in FIGS. 4a-4b, or a flat stamping plate, as shown in FIGS. 5a-5b, for example. Therefore, the impression of the coolant passage or channel 34 within the winding may be made using at least one roller on which the die is located and/or a linearly displacing flat stamping plate. If a roller is used, as depicted schematically in FIGS. 4a-4b, the material 31 which is to be used to form the winding portion 30, such as copper flat stock for example, is fed between a pair of opposed rollers 42, at least one of which includes the die 44 (i.e. the inverse of the cooling pattern to be impressed into the surface of the winding portion) thereon. FIG. 4b depicts such an embodiment wherein the die 44 is disposed on only a single one (the top one in the case of the embodiment depicted) of the opposed rollers 42. If cooling channels are to be formed on both opposed sides of the winding material, both of the pinching rollers through which the material is fed may have an impression die thereon (as shown in FIG. 4a), such that both sides of the material have the cooling flow channels impressed therein as the material sheet is forced between the rollers. At least one, but preferably both, of the two pinching rollers 42 are powered. In either of the arrangements of FIGS. 4a and 4b, the rollers may be coupled together by gear teeth (not shown) formed as a part of the rollers, in which case only a first one of the two rollers 42 is actually externally driven, while the second roller is driven by the first. Although preferably two pinching rollers are employed, it remains possible to use only one roller having the impression die thereon, the winding material being thus fed between a fixed base surface and the pinching roller. Further, more than two rollers may also be used.

In the alternate embodiment depicted schematically in FIGS. 5a-5b, a die 46 corresponding to the desired fluid flow coolant passage is disposed on a flat stamping plate 48 beneath which the winding material 31 is accordingly placed, and the entire winding portion 30 is stamped by the press plate. 48 in order to form the fluid flow coolant channel 34 therein in a single stamping operation.

Forming the open-toped fluid flow channel 34 in the portion 30 of the winding 26 by using an impressing method as described permits improved time and cost effective manufacture of the small fluid flow passages 34 within the windings 26, in comparison with other manufacturing techniques such as milling, routing, etching or electric discharge machining for example.

As seen in FIG. 3, in an alternate application a flat heat-exchanger plate 50 is similarly impressed (whether by roller, flat press, or otherwise) such as to form a plurality of fluid flow passages 52 therein. The plate 50 may be either used whole as a heat sink for dissipating heat from electronic equipment for example, or may be subdivided, into several individual portions therefore to be used as windings 26 in an electrical machine 20. The sub-division of the larger plate 50 into individual windings may be performed either following the step of impressing the fluid flow passage 52 therein, or simultaneously thereof (for example, the flat stamping plate 48 has the die 46 thereon for impressing the channels in the plate, and additionally has cutters for splitting the plate 50 into smaller winding 26).

Referring now back to FIG. 2, once the fluid flow channel 34 is formed as described above in the first portion 30 of the winding 26, the open-topped channel 34 is enclosed and sealed such as to define an internal fluid flow passage within the body of the winding. Thus, as shown in FIG. 6, in order to create an enclosed fluid flow passage within the winding once the channel 34 has been impressed in the first body portion 30 thereof, a closure 60 having a lower planar sealing surface 62 is abutted against the substantially flat peripheral surface 40 of the winding body portion 30 and is sealingly fastened thereto such as to enclose the channel 34 to form a fluid flow passage within the winding through which coolant fluid may be fed under pressure. In one embodiment, the closure 60 is fastened to the peripheral surface 40 the winding body 30 about a perimeter thereof, outward from the channel 34 defined therein. While the closure 60 of the winding 26 may, in an alternately embodiment, be similarly provided with a corresponding (but mirror image) channel 34 therein, the closure 60 which forms a second portion of the winding body is preferably simply a flat sealing member which serves to enclose and seal the open-topped channel 34 formed in the body portion 30 of the winding 26. The closure 60 may therefore be either the same (in terms of dimensions, material, etc.) as the first body portion 30 but without a channel formed therein or alternately may be a relatively thin sealing sheet, such as one made of metal foil, plastic, polymer, a combination thereof or another suitable material which can be fastened to the main body 30 of the winding and will seal the open-topped channel 34 therein. Regardless of type, the closure 60 includes a lower planar sealing surface 62 which can be wrapped over at least the peripheral surface 40 of the winding body 30, and preferably all the way around at least the longitudinal side walls of the winding 26, as shown in FIG. 6. The planar sealing surface 62 of the closure 60 abuts against the substantially flat peripheral surface 40 of the winding body 30, and defines at least a part of a wall enclosing the fluid flow passage when sealingly fastened to the winding body 30. This permits a relatively quick and cost-effective method of sealing the open-topped channel 34 formed within the first portion 30 of the winding by impressing the fluid flow path die therein as described above.

The above description is meant to be exemplary only, and one skilled in the art will recognize that changes may be made to the embodiments described without departing from the scope of the invention disclosed. For example, although the electrical winding and heat sink plate are described as being made of copper or aluminum, any suitable conducting materials can be used. Although a sinusoidal or serpentine passage is depicted, any suitable channel configuration may be provided. Also, although a regular repetition of segments geometry(ies) is preferred for the coolant flow path, the channel geometry, angles, size, etc. may be tailored almost infinitely as required to suit the designer's needs. Although windings having a flat planar peripheral surface is described, any suitable winding shape may be used. Still other modifications will be apparent to those skilled in the art, in light of a review of this disclosure, and such modifications are intended to fall within the appended claims.

The invention claimed is:

1. A method of making a winding of an electric machine having a channel being adapted to receive coolant fluid therein for cooling the winding, the method comprising:
   providing at least one winding portion with peripheral surface in which to form the fluid flow channel;
   providing a die having a shape corresponding to a desired fluid flow cooling path; and
   impressing the channel into the peripheral surface of the winding portion using the die, the channel having the fluid flow cooling path of the die.

2. The method as defined in claim 1, wherein the die is disposed on a roller, the step of impressing further comprising using the roller to impress the channel into the peripheral surface of the winding portion.

3. The method as defined in claim 1, wherein the die is disposed on a flat stamping plate, the step of impressing further comprising stamping the channel into the peripheral surface of the winding portion.

4. The method as defined in claim 2, further comprising providing a pair of rollers opposed to and disposed in pinching arrangement with each other, the die being disposed on at least one of the pair of rollers, the step of impressing further comprising feeding the winding portion between the pair of rollers.

5. The method as defined in claim 4, further comprising driving at least one of the pair of rollers for rotation.

6. The method as defined in claim 5, further comprising driving both of the pair of rollers.

7. The method as defined in claim 4, further comprising using the pair of rollers to provide a shape to said winding portion while simultaneously impressing the channel therein.

8. The method as defined in claim 3, further comprising stamping a plurality of channels into the substantially flat peripheral surface of a plate, and sub-dividing the plate into a plurality of individual winding portions.

9. The method as defined in claim 8, further comprising performing the step of sub-dividing said plate simultaneously with the step of stamping said plurality of channels therein.

10. A method of forming a fluid flow passage within a winding of an electric machine, the passage being adapted to receive coolant fluid therein for cooling the winding, the method comprising:
   providing a winding body with a peripheral surface;
   impressing an open-topped channel into the peripheral surface of the winding body using a die having a shape corresponding to a desired fluid flow cooling path, the channel thereby defining said fluid flow cooling path; and
   enclosing the channel to define the fluid flow passage within the winding body by sealingly engaging a sealing surface of a closure against the peripheral surface of the winding body.

11. The method as defined in claim 10, wherein the closure is a relatively thin sheet, the step of enclosing further comprising wrapping said sheet over at least the peripheral surface of the winding body.

12. The method as defined in claim 10, wherein the step of sealingly engaging further comprises fastening the closure to the peripheral surface of the winding body about a perimeter of the peripheral surface outward from the channel defined therein.

13. The method as defined in claim 11, wherein the step of impressing further comprises at least one of: using at least one roller having the die thereon to impress the channel into the peripheral surface of the winding body; and using a flat stamping plate having the die thereon to impress the channel into the peripheral surface.

14. A winding for an electric machine made according to the method of claim 11.

15. A method of manufacturing an electric machine winding comprising:
   impressing an open-topped fluid flow channel into at least one peripheral surface of a body portion of the winding; and
   enclosing the channel to define a fluid flow passage within the winding by sealingly engaging a planar sealing surface of a closure against the peripheral surface of the body portion, the planar sealing surface defining at least a part of a wall enclosing the fluid flow passage.

16. The method as defined in claim 15, wherein the step of impressing further comprises at least one of: using at least one roller having a die thereon to impress the channel into the peripheral surface, the die having a shape corresponding to a desired fluid flow cooling path for said channel; and using a flat stamping plate having the die thereon to impress the channel into the peripheral surface.

17. A winding for an electric machine made according to the method of claim 15.

18. An electric machine comprising a rotor, a stator and at least one winding, the winding having a body including a channel having an open top and formed in a peripheral surface thereof, the channel defining a predetermined coolant flow path and extending between an inlet in communication with a source of coolant fluid and an outlet in communication with a collector of the coolant fluid, a closure fastened to the body to enclose the open top of the channel such as to form a sealed fluid flow passage having the coolant flow path within the winding, the closure including a mating sealing surface abutted against the peripheral surface of the winding body, the planar sealing surface defining at least a part of a wall enclosing the fluid flow passage.

19. The electric machine as defined in claim 18, wherein the closure is a relatively thin sheet of sealing material.

20. The electric machine as defined in claim 19, wherein the sealing material comprises at least one of a metal foil, plastic and polymer.

* * * * *